United States Patent
Arai

(10) Patent No.: US 8,750,648 B2
(45) Date of Patent: Jun. 10, 2014

(54) IMAGE PROCESSING APPARATUS AND METHOD OF PROCESSING IMAGE

(75) Inventor: Hiroshi Arai, Kanagawa (JP)

(73) Assignee: Sony Corporation, Tokyo (JP)

( * ) Notice: Subject to any disclaimer, the term of this patent is extended or adjusted under 35 U.S.C. 154(b) by 111 days.

(21) Appl. No.: 13/474,899

(22) Filed: May 18, 2012

(65) Prior Publication Data

US 2012/0301036 A1    Nov. 29, 2012

(30) Foreign Application Priority Data

May 26, 2011    (JP) ................................ 2011-117697

(51) Int. Cl.
*G06K 9/32*    (2006.01)
*G06K 9/36*    (2006.01)

(52) U.S. Cl.
USPC ........................................ 382/300; 382/276

(58) Field of Classification Search
USPC ................... 382/173–180, 232–254
See application file for complete search history.

(56) References Cited

U.S. PATENT DOCUMENTS

| | | | |
|---|---|---|---|
| 6,195,459 B1* | 2/2001 | Zhu | 382/176 |
| 6,975,753 B2* | 12/2005 | Matsuura et al. | 382/132 |
| 2002/0169735 A1* | 11/2002 | Kil et al. | 706/46 |
| 2003/0218776 A1* | 11/2003 | Morimoto et al. | 358/2.1 |
| 2005/0169529 A1* | 8/2005 | Owechko et al. | 382/190 |

FOREIGN PATENT DOCUMENTS

| | | |
|---|---|---|
| JP | 7-129769 | 5/1995 |
| JP | 2009-33385 | 2/2009 |

\* cited by examiner

*Primary Examiner* — Alex Liew
(74) *Attorney, Agent, or Firm* — Frommer Lawrence & Haug LLP; William S. Frommer

(57) ABSTRACT

An image processing apparatus includes a characteristic point extracting section and a signal processing section. The characteristic point extracting section is configured to analyze a frequency component of an inputted image and extracts a plurality of pixels characterizing the image as a plurality of characteristic points. The signal processing section is configured to perform signal processing for the plurality of extracted pixels corresponding to the respective characteristic points, produces an interpolated value based on a result of the signal processing, and rewrites a value of at least one pixel other than the characteristic points to the interpolated value.

8 Claims, 12 Drawing Sheets

Two-dimensional image

Extraction of characteristic points based on two-story wavelet transform

IMAGE PROCESSING APPARATUS AND METHOD OF PROCESSING IMAGE

BACKGROUND

The present disclosure relates to an image processing apparatus for processing a digital image, and a method of processing a digital image.

Signal processing for the object of changing visibility of the image, such as white balance processing, black level adjustment, gamma correction, and KNEE correction of a digital image is generally performed for unprocessed image data obtained by image pickup.

For example, in Japanese Patent Application Laid-open No. 2009-033385 referred to as Patent Document 1, a technology relating to white balance adjustment for raw image data denoting unprocessed image data is described.

On the other hand, recently, digital high-definition broadcasting has been rapidly spread with the transition to terrestrial digital broadcasting. The high-definition data is now prescribed as image being 1920 pixels by 1080 pixels. However, it is predicted that the image resolution is further heightened in the future by super high resolution high-definition image such as 4K image being approximately 4000 pixels by 2000 pixels or 8K image being approximately 8000 pixels by 4000 pixels.

When the image resolution is heightened, the total amount of calculation for signal processing such as white balance processing, black level adjustment, gamma correction and KNEE correction becomes large. Therefore, the processing time is increased, and the electric power consumed in an apparatus performing the arithmetic processing is increased.

Further, in Japanese Patent Application Laid-open No. Hei 07-129769 (paragraph [0005]) referred to as Patent Document 2, a method of detecting a point having a significant change in an image as a characteristic point is described. For example, an analyzed value is calculated by analyzing a characteristic point of a signal having correlation between signals adjacent to each other so as to extract the point, a maximum value of the analyzed value is detected, a predetermined value corresponding to the maximum value is calculated as a threshold value, the threshold value and the analyzed value are compared with each other, and the analyzed value equal to or more than the threshold value is detected as a characteristic point. For the analysis, differential processing of a signal is adopted. However, in the Patent Document 2, neither the technology that signal processing for an image detected as a characteristic point is performed nor the technology that the result of the signal processing is set as an interpolated value and a value of at least one pixel other than the characteristic point is rewritten to the interpolated value is described.

SUMMARY

In view of the circumstances as described above, there is a need for an image processing apparatus and a method of processing an image that are capable of suppressing or preventing the increase of processing time and consumed electric power, when signal processing for an image having a high resolution is performed, and are adequate to practical use.

According to an embodiment of the present disclosure, there is provided an image processing apparatus including: a characteristic point extracting section configured to analyze a frequency component of an inputted image and extracts a plurality of pixels characterizing the image as a plurality of characteristic points; and a signal processing section configured to perform signal processing for the plurality of extracted pixels corresponding to the respective characteristic points, produces an interpolated value based on a result of the signal processing, and rewrites a value of at least one pixel other than the characteristic points to the interpolated value.

In the image processing apparatus according to the embodiment of the present disclosure, the signal processing section performs signal processing for a plurality of pixels, respectively, corresponding to a plurality of characteristic points extracted by the characteristic point extracting section, produces an interpolated value based on a result of the signal processing, and rewrites a value of one or more pixels other than the characteristic points to the interpolated value. Accordingly, even when the signal processing is not performed for all pixels of the image, an image which is approximately the same as an image obtained as a result of the signal processing performed for all pixels can be obtained, the number of repetitions of the signal processing can be considerably reduced, the processing speed can be heightened, and the consumed electric power can be suppressed.

The characteristic point extracting section sets each of regions of the inputted image, in which a difference between pixels adjacent to each other is within a threshold value, as a pixel group and extracts at least one pixel as one characteristic point for each pixel group. The signal processing section may produce the interpolated value for each pixel group, based on the result of the signal processing for the pixel corresponding to the characteristic point belonging to the pixel group, and rewrite the value of one pixel other than the characteristic point in the pixel group to the interpolated value of the pixel group.

The signal processing section may perform a plurality of types of signal processing, and the characteristic point extracting section may extract the characteristic point by using the threshold value, which is selected in advance so as to match with the type of signal processing, for each type of signal processing. Accordingly, the characteristic points can be shifted in accordance with the types of signal processing, and the flexible adjustment is possible.

According to another embodiment of the present disclosure, there is provided an image processing apparatus including a characteristic point extracting section configured to divide an inputted image into pixel groups each of which is two pixels in a lateral direction by two pixels in a longitudinal direction, extract at least one pixel for each pixel group as a characteristic point in accordance with a difference between pixels adjacent to each other in the pixel group, and classify the extracted characteristic points to high level characteristic points and low level characteristic points; a frequency disassembling section configured to produce an intermediate wavelet image by performing wavelet transform for the pixels determined to be the low level characteristic points to produce a wavelet transformed image and dividing the pixel groups including the pixels determined to be the high level characteristic points into four quadrants to divide the inputted image into three high frequency components and a low frequency component of the wavelet transformed image; a signal processing section configured to perform signal processing for the pixels of the high level characteristic points and the low frequency component in the intermediate wavelet image to change visibility of the pixels; and a finalizing processing section configured to perform the wavelet transform for the pixels of the high level characteristic points of the intermediate wavelet image for which the signal processing has been performed.

In the image processing apparatus according to the embodiment of the present disclosure, even when the signal processing is not performed for all pixels of the image, an image which is approximately the same as an image obtained as a result of the signal processing performed for all pixels can be obtained, the number of repetitions of the signal processing can be considerably reduced, the processing speed can be heightened, and the consumed electric power can be suppressed.

The signal processing section may perform the signal processing for the pixels to be subjected to the signal processing by using a value of at least one peripheral pixel located on a periphery of the pixel. When one of a portion and all of the at least one peripheral pixel includes pixels other than the characteristic point, the characteristic point extracting section may give an interpolated value based on the value of the pixel of the characteristic point of the pixel group to the pixels other than the characteristic point of the pixel group to upgrade the pixels other than the characteristic point to character points. Accordingly, the image processing apparatus can perform the signal processing such as detail processing or bi-cubic interpolation necessary to use values of the plurality of peripheral pixels.

Further, the finalizing processing section may have a signal preprocessor configured to perform a specific type of signal processing for at least one pixel group, which includes one high level characteristic point, among the pixel groups, each of which includes one peripheral pixel to be referred to for the signal processing, before the production of the intermediate wavelet image. Accordingly, even when the signal processing needing values of a plurality of peripheral pixels is performed, the ratio of characteristic points occupying the transmitted image is not increased, and the reduction of the compression effect can be suppressed.

According to another embodiment of the present disclosure, there is provided a method of processing an image, including: extracting a plurality of pixels characterizing an inputted image as a plurality of characteristic points by analyzing a frequency component of the image; and rewriting a value of at least one pixel other than the characteristic points to an interpolated value by performing signal processing for the plurality of extracted pixels corresponding to the respective characteristic points and by producing the interpolated value based on a result of the signal processing.

According to another embodiment of the present disclosure, there is provided a method of processing an image, including: dividing an inputted image into pixel groups each of which is two pixels in a lateral direction by two pixels in a longitudinal direction; extracting at least one pixel for each pixel group as a characteristic point in accordance with a difference between pixels adjacent to each other in the pixel group; classifying the extracted characteristic points to high level characteristic points and low level characteristic points; producing an intermediate wavelet image by performing wavelet transform for the pixels determined to be the low level characteristic points to produce a wavelet transformed image and dividing the pixel groups including the pixels determined to be the high level characteristic points into four quadrants to divide the inputted image into three high frequency components and a low frequency component of the wavelet transformed image; performing signal processing for the pixels of the high level characteristic points and the low frequency component in the intermediate wavelet image; and performing the wavelet transform for the pixels of the high level characteristic points of the intermediate wavelet image for which the signal processing has been performed.

As described above, in the present disclosure, the image processing apparatus and the method of processing an image can suppress or prevent the increase of processing time and consumed electric power, when signal processing for an image having a high resolution is performed, while being adequate to practical use.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

(First Embodiment)

Figure 1:
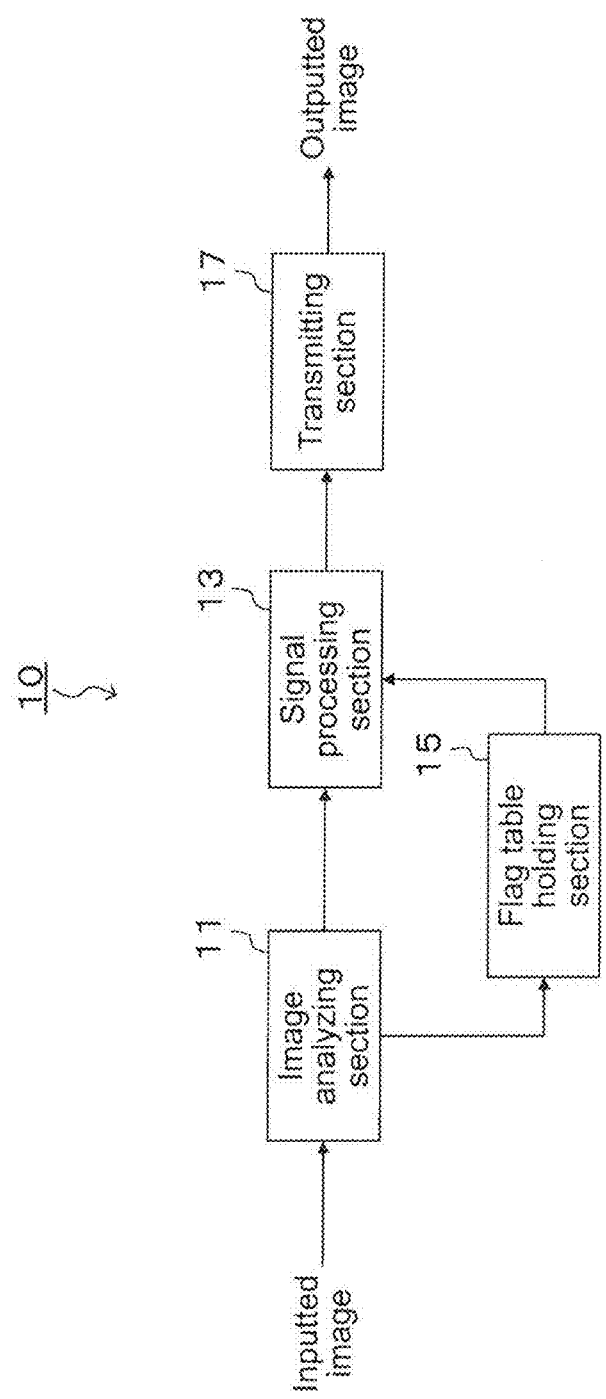
FIG. 1 is a block diagram showing the configuration of an image processing apparatus according to a first embodiment of the present disclosure.

FIG. 1 is a block diagram showing the configuration of an image processing apparatus according to a first embodiment of the present disclosure.

This image processing apparatus 10 has an image analyzing section 11 (a characteristic point extracting section), a signal processing section 13, a flag table holding section 15, and a transmitting section 17.

The image analyzing section 11 analyzes frequency components of an inputted image and extracts one or more characteristic points indicating positions of one or more pixels characterizing the image.

The flag table holding section 15 holds position information of pixels determined to be the characteristic points.

The signal processing section 13 performs signal processing for one or more pixels extracted as the characteristic points by the image analyzing section 11, sets the result of the signal processing as an interpolated value and rewrites values of pixels other than the characteristic points to the interpolated value.

The transmitting section 17 transmits an image obtained in the signal processing section 13 as an output image.

(Method of Extracting Characteristic Points)

Figure 2:
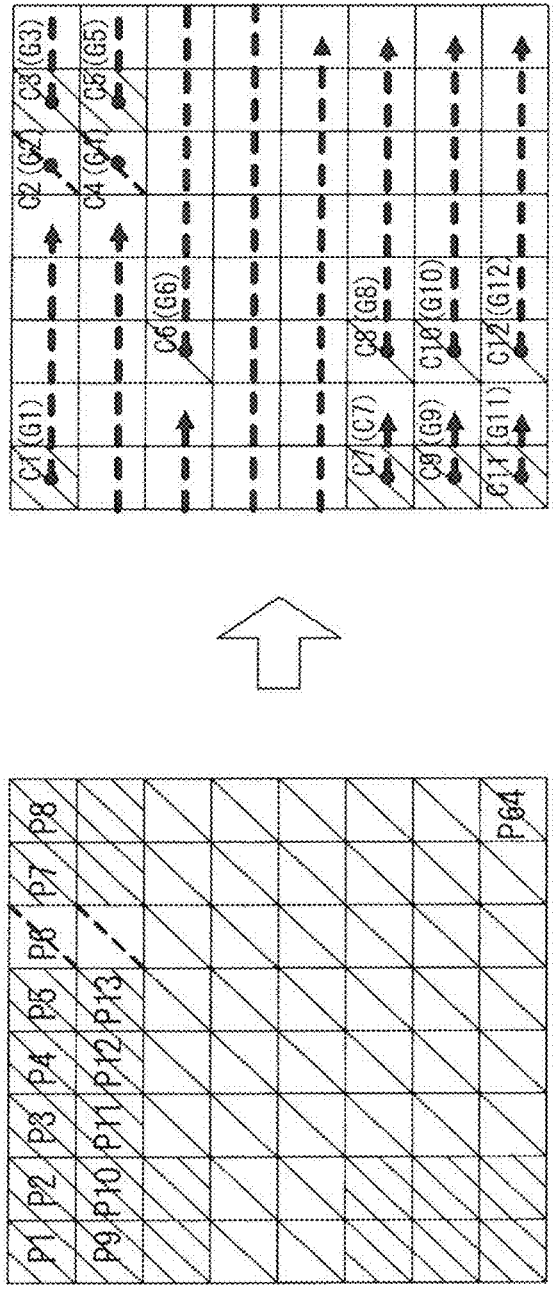
FIG. 2 is a diagram explaining a method of extracting characteristic points.
Figure 3:
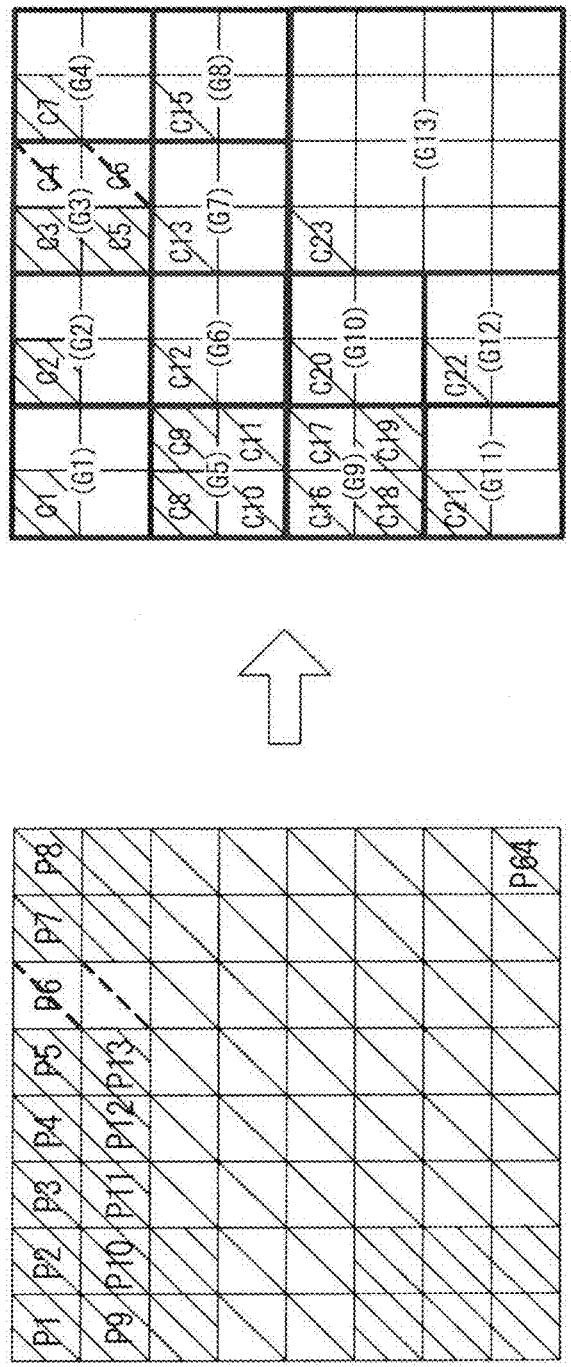
FIG. 3 is a diagram explaining another method of extracting characteristic points.
Figure 4:
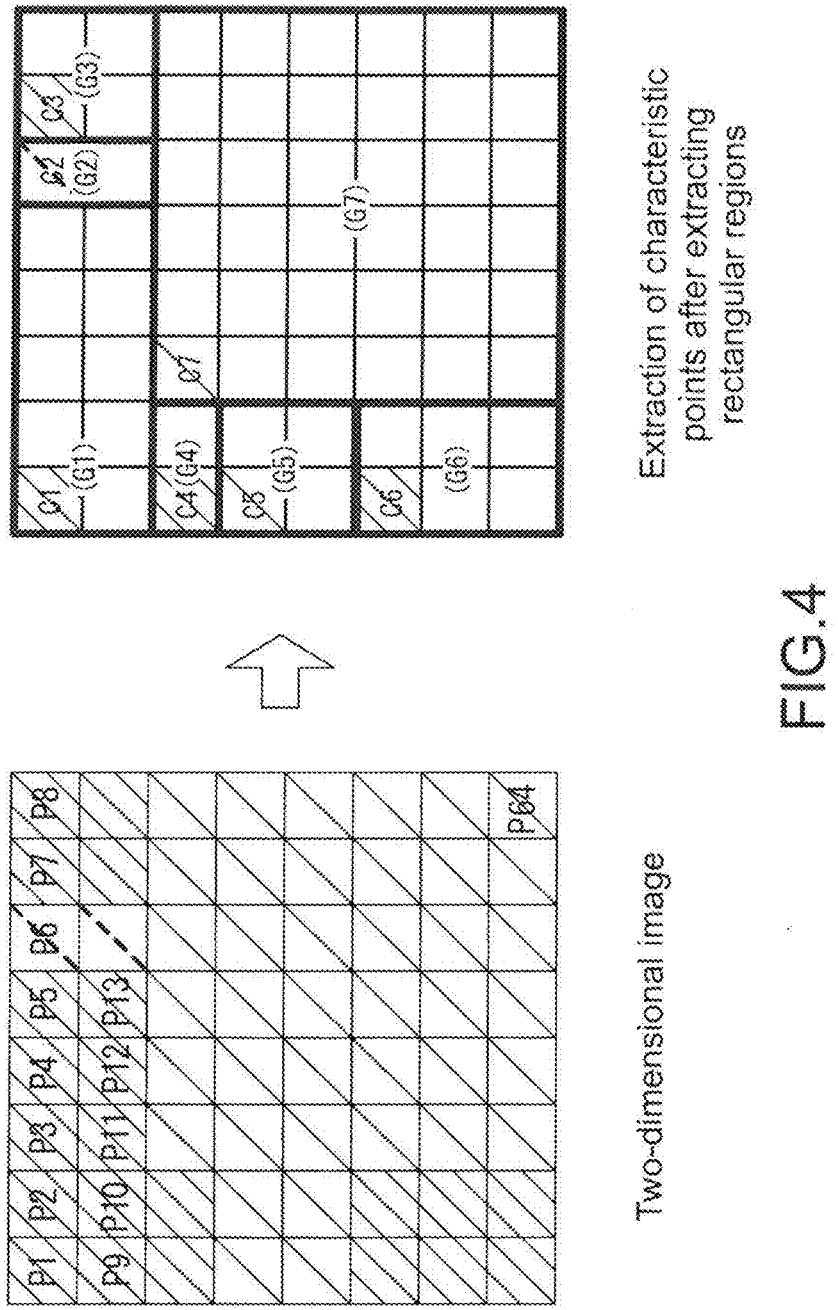
FIG. 4 is a diagram explaining still another method of extracting characteristic points.

FIG. 2, FIG. 3 and FIG. 4 are diagrams, respectively, explaining methods of extracting characteristic points by analyzing frequency components of the image.

Methods of extracting characteristic points are, for example, as follows.

A. The image analyzing section 11 scans an image along a horizontal direction (or a perpendicular direction), sets each of regions, in which a difference between values of pixels adjacent to each other in the scanning direction is within a threshold value, as one pixel group, and sets one pixel as a characteristic point for each pixel group (see FIG. 2). Here, the threshold value is appropriately selected according to the type of signal processing.

B. The image analyzing section 11 sets each of rectangular regions, in which a difference between values of pixels adjacent to each other in the horizontal direction or a difference between values of pixels adjacent to each other in the perpendicular direction is within a threshold value, as one pixel group, and sets one pixel as a characteristic point for each rectangular region (or group) (see FIG. 3).

C. The image analyzing section 11 divides the image into a low frequency component and a high frequency component by wavelet transform, for example, for each region being two pixels by two pixels (hereinafter, called 2×2 pixel region) and for each region being four pixels by four pixels (hereinafter, called 4×4 pixel region). A region having a maximum number of pixels among regions, in which values (e.g., average values or maximum values) of differences in a longitudinal direction, a lateral direction and diagonal directions obtained by the wavelet transform for the 2×2 pixel regions and for the 4×4 pixel regions are within a threshold value, is set as one group, and one or more pixels of the group are determined to be characteristic points. Further, when values (e.g., average values or maximum values) of differences in a longitudinal direction, a lateral direction and diagonal directions obtained by the wavelet transform for one 2×2 pixel region are not within the threshold value, the image analyzing section 11 sets all the pixels in the 2×2 pixel region as characteristic points (see FIG. 4). In FIG. 4, the wavelet transform are performed for the 2×2 pixel regions and the 4×4 pixel regions. However, characteristic points may be extracted by performing the wavelet transform for each region having a larger number of pixels.

In the following description of the present embodiment, the case where the extraction of characteristic points is performed by adopting the method A described above is described in detail. However, the cases of other extracting methods are the same.

In the example shown in FIG. 2, the image analyzing section 11 calculates differences between values of pixels adjacent to each other in the scanning direction in an inputted two-dimensional image in the order of the difference between pixels P1 and P2, the difference between pixels P2 and P3, the difference between pixels P3 and P4, . . . . In the two-dimensional image shown in FIG. 2, each square corresponds to one pixel. The same pattern in squares denotes that a difference between values of pixels adjacent to each other in the scanning direction is within a first threshold value. Further, one or more pixels successively having the same pattern along the scanning direction form one pixel group. For example, a series of pixels P1 to P5 forms a pixel group G1, a pixel P6 forms a pixel group G2, and a series of pixels P7 to P13 forms a pixel group G3. In this example, twelve pixel groups G1 to G12 in total are determined by the image analyzing section 11.

The image analyzing section 11 determines one of pixels in each pixel group to be a characteristic point. For example, FIG. 2 shows the case where front pixels of the pixel groups in the scanning direction are set as characteristic points C1 to C12. However, the present disclosure is not limited to the above case. For example, last pixels or center pixels may be set. As described above, the image analyzing section 11 extracts characteristic points of the image and registers positions of the pixels being the characteristic points to a flag table held in the flag table holding section 15.

The signal processing section 13 specifies the pixels in the image, determined to be the characteristic points, according to the flag table, performs signal processing for values of these pixels, prepares interpolated values from results of this signal processing, and rewrites values of pixels other than the characteristic points to the interpolated values. For example, there is a method that values of pixels other than a characteristic point in a pixel group, to which the characteristic point belongs, are interpolated by using a result of the signal processing for the characteristic point. As an interpolating method, for example, there is a copy method of giving a result of the signal processing for a characteristic point, as it is, to pixels other than the characteristic point. However, the present disclosure is not limited to this method.

The transmitting section 17 transmits the image obtained by the signal processing section 13 as an output image. Further, in the case of circumstances where a transmission line of two or more channels can be used, the transmitting section 17 may divide the image into a low frequency component and a high frequency component by the wavelet transform or the like to transmit the components, one or both of which are compressed by entropy coding, via the respective channels. Moreover, when the low frequency component set in a non-compressed state is transmitted, there is a merit that the image can be monitored, as it is, in an apparatus receiving the transmitted image without performing entropy inverse coding.

As described above, in this embodiment, frequency components of an inputted image are analyzed to extract pixels characterizing the image as characteristic points, signal processing is performed for the pixels being the characteristic points, and values of pixels other than the characteristic points are interpolated by using results of this signal processing. Accordingly, even when the signal processing is not performed for all pixels of the image, an image being approximately the same as an image, in which the signal processing is performed for all pixels, can be obtained. Further, as compared with the case where the signal processing is performed for all pixels of an image, the amount of the signal processing can be reduced, so that the processing speed can be enhanced.

Further, in this embodiment, according to the threshold value used to extract characteristic points, there is the probability that an image in the result of the signal processing for the high frequency component becomes largely different from the original image. However, as the frequency becomes higher, the perception of the difference from the original image is reduced due to the nature of the sense of sight in a human being. Therefore, there is no problem in the practical use.

The image processing apparatus 10 according to this embodiment is particularly appropriate to the signal processing such as white balance processing or black level correction in which the same result is obtained from original pixels when values of the pixels are the same.

(Second Embodiment)

Figure 5:
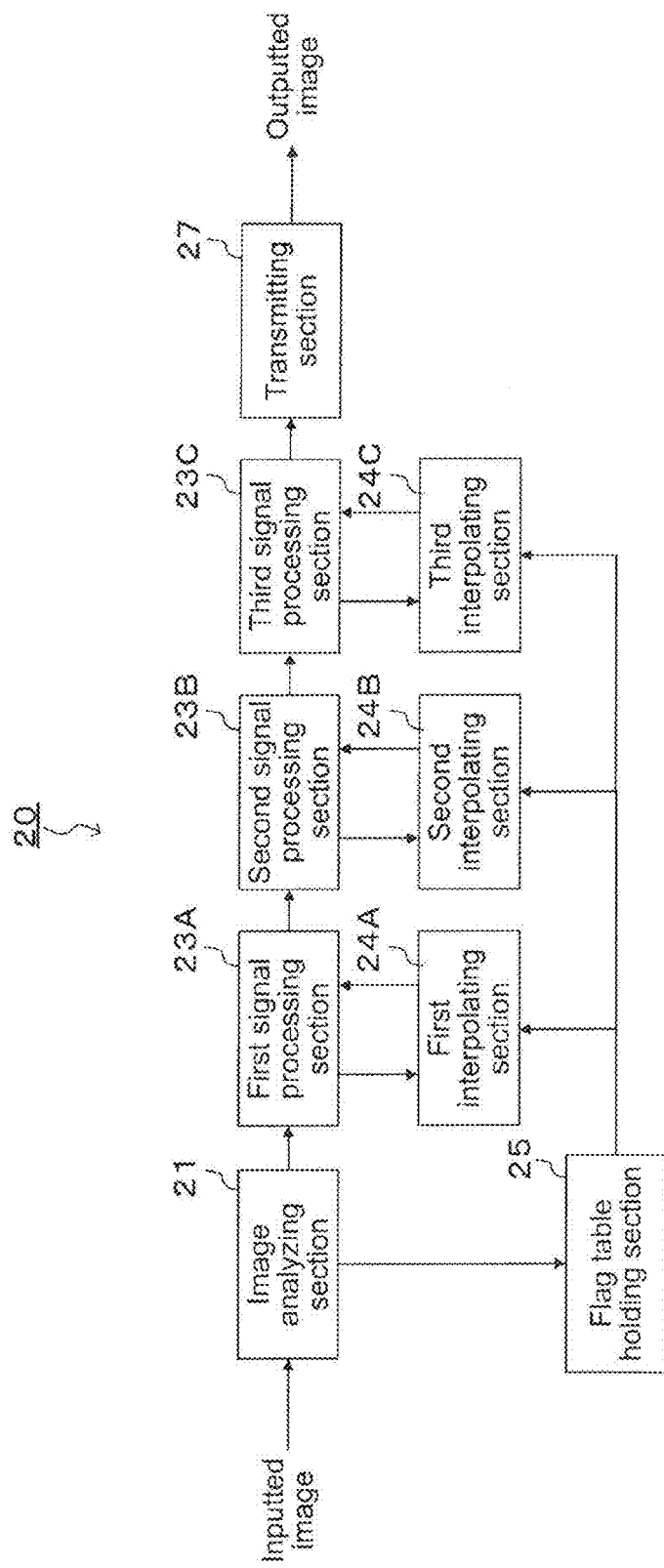
FIG. 5 is a block diagram showing the configuration of an image processing apparatus according to a second embodiment of the present disclosure.

FIG. 5 is a block diagram showing the configuration of an image processing apparatus according to a second embodiment of the present disclosure.

This image processing apparatus 20 has an image analyzing section (a characteristic point extracting section) 21, a plurality of signal processing sections (a first signal processing section 23A, a second signal processing section 23B, and a third signal processing section 23C) for performing signal processing, a plurality of interpolating sections 24A, 24B and 24C corresponding to the respective signal processing sections 23A, 23B and 23C, a flag table holding section 25, and a transmitting section 27. A plurality of signal processing sections may be provided.

The image analyzing section 21 analyzes frequency components of an inputted image, groups pixels by using a threshold value selected in accordance with a type of the signal processing, and performs determination on characteristic points. The groups and position information of the characteristic points are registered to a flag table. That is, in this embodiment, information indicating to which group each pixel of the image belongs and information indicating pixels being characteristic points are registered to the flag table.

The signal processing sections 23A, 23B and 23C specify pixels of the image being the characteristic points in accordance with the flag table and performs a predetermined type of signal processing for values of these pixels. The contents of the signal processing in the three signal processing sections 23A, 23B and 23C according to this embodiment may be differentiated from one another or may be the same, or the contents of the signal processing in two of the signal processing sections may be the same.

The interpolating sections 24A, 24B and 24C interpolates values of pixels other than the characteristic points by using results of the signal processing for the characteristic points obtained from the corresponding signal processing sections 23A, 23B and 23C.

In the first embodiment, the signal processing section 13 performs both the signal processing for the characteristic points and the interpolation for values of pixels other than the characteristic points. In contrast, in the second embodiment, the signal processing and the interpolation are performed in respective circuits. Accordingly, the enhancement of processing efficiency can be expected.

Next, an action of the image processing apparatus 20 according to this embodiment will be described.

Figure 6:
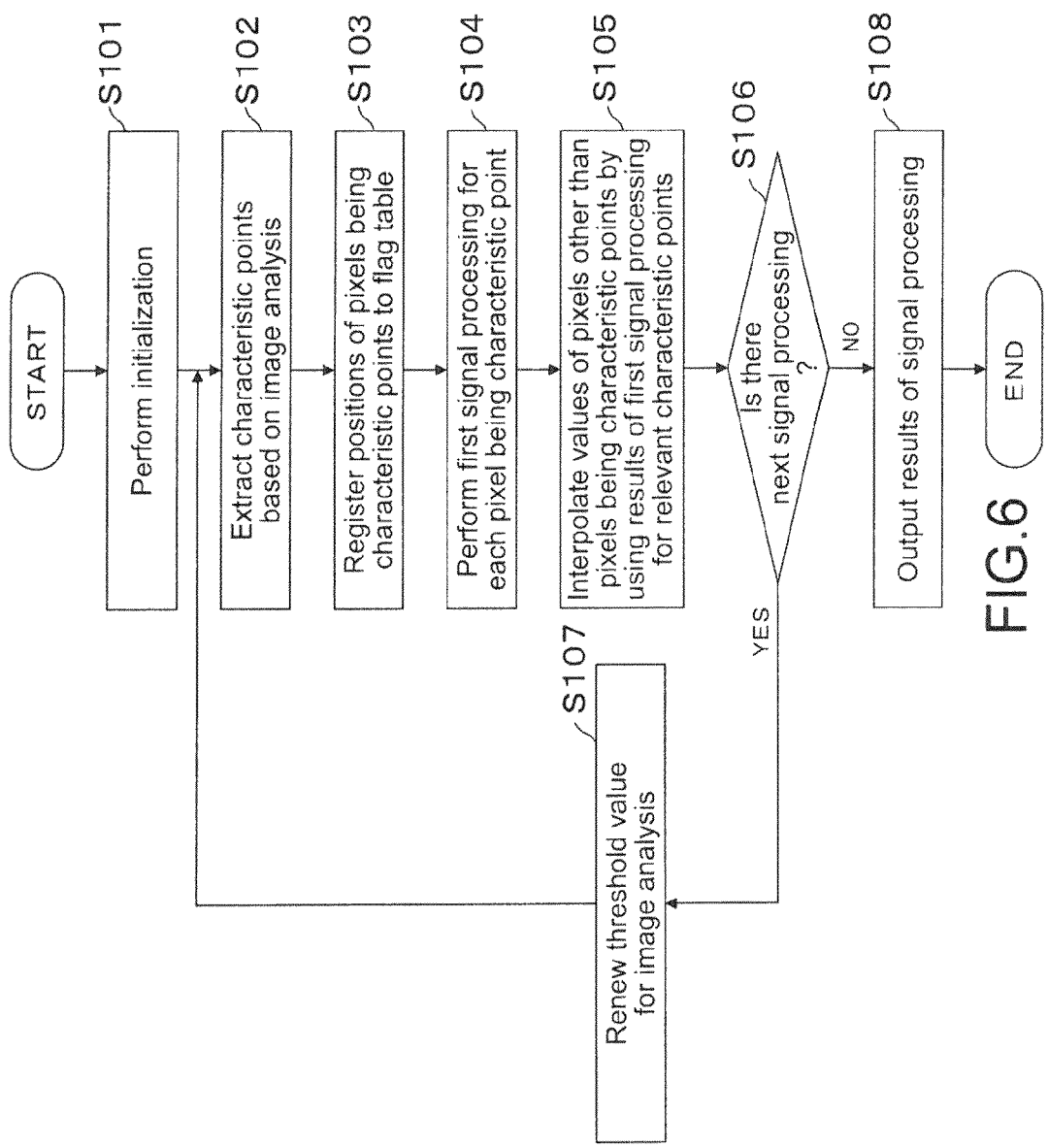
FIG. 6 is a flowchart showing the procedure of an action of the image processing apparatus according to the second embodiment.

FIG. 6 is a flowchart showing the procedure of an action of the image processing apparatus 20 according to this embodiment.

In this action described hereinafter, the contents of the signal processing in the three signal processing sections 23A, 23B and 23C differ from one another.

Initially, initializing processing of the image processing apparatus 20 such as initialization of registers and memories in the image processing apparatus 20 is performed (step S101).

Thereafter, an image is inputted to the image processing apparatus 20. In the image analyzing section 21, frequency components of the inputted image are initially analyzed. In this embodiment, the three signal processing sections 23A, 23B and 23C perform different types of signal processing. The three types of signal processing are performed in the order of first signal processing in the first signal processing section 23A, second signal processing in the second signal processing section 23B and third signal processing in the third signal processing section 23C. Threshold values for image analysis selected so as to match with the respective types of signal processing are prepared in advance for the respective types of signal processing. Here, a threshold value for image analysis selected so as to match with the signal processing in the first signal processing section 23A is called a "first threshold value", a threshold value for image analysis selected so as to match with the signal processing in the second signal processing section 23B is called a "second threshold value", and a threshold value for image analysis selected so as to match with the signal processing in the third signal processing section 23C is called "a third threshold value". It is not necessary that these threshold values differ from one another. For example, there is the case where two of the types of signal processing have the same threshold value. In this case, the image analysis for the grouping and the extraction of characteristic points may be performed only once just before the two types of signal processing. However, this embodiment will be described while assuming that all of the first threshold value, the second threshold value and the third threshold value differ from one another.

Initially, the grouping of pixels and the extraction of characteristic points in the image analysis of the image analyzing section 21 are performed by using the first threshold value selected so as to match with the first signal processing performed first (step S102). The grouping of pixels and the extraction of characteristic points in the image analyzing section 21 may be performed according to one of the methods A, B and C described above. When completing the grouping of pixels and the extraction of characteristic points, the image analyzing section 21 registers the groups and position information of the characteristic points to the flag table (step S103).

The first signal processing section 23A specifies positions of the pixels being the respective characteristic points in the image in accordance with the flag table and performs the first signal processing for values of these pixels (step S104). A result of the first signal processing for each characteristic point is supplied to the first interpolating section 24A. When receiving the result of the first signal processing for each characteristic point, the first interpolating section 24A specifies pixels other than the characteristic point in each group, to which the characteristic point belongs, while referring to the flag table, and gives the result of the first signal processing for the characteristic point to these pixels as an interpolated result (step S105). The first interpolating section 24A supplies the interpolated result, given to the pixels, to the first signal processing section 23A. Accordingly, the results of the first signal processing for the whole image can be obtained by only performing the signal processing for the characteristic points.

The first signal processing section 23A supplies the results of the first signal processing for the whole image, which includes the results of the first signal processing for the characteristic points and the interpolated results given to the pixels other than the characteristic points, to the second signal processing section 23B.

Next, the grouping of pixels and the extraction of characteristic points in the image analysis of the image analyzing section 21 are again performed by using the second threshold value selected in advance so as to match with the type of second signal processing (steps S107 and S102). The flag table is renewed with the groups and position information of the characteristic points (step S103).

Thereafter, in the same manner as the first signal processing, the second signal processing section 23B specifies positions of pixels being the respective characteristic points in the image in accordance with the flag table and performs the second signal processing for values of these pixels (step S104). A result of the second signal processing for each characteristic point is supplied to the second interpolating section 24B. When receiving the result of the second signal processing for each characteristic point, the second interpolating section 24B specifies pixels other than the characteristic point in each group, to which the characteristic point belongs, while referring to the flag table, and gives the result of the second signal processing for the characteristic point to these pixels as an interpolated result (step S105). The second interpolating section 24B supplies the interpolated result, given to the pixels, to the second signal processing section 23B. Accordingly, the results of the second signal processing for the whole image can be obtained by only performing the signal processing for the characteristic points.

The second signal processing section 23B supplies the results of the second signal processing for the whole image, which includes the results of the second signal processing for the characteristic points and the interpolated results given to the pixels other than the characteristic points, to the third signal processing section 23C.

Next, the grouping of pixels and the extraction of characteristic points in the image analysis of the image analyzing section 21 are again performed by using the third threshold value selected in advance so as to match with the type of third signal processing (steps S107 and S102), and the flag table is renewed with the groups and position information of the characteristic points (step S103). The following action is the same as the action in the first signal processing and the second signal processing.

The image for which the first signal processing, the second signal processing and the third signal processing are performed as described above is transmitted by the transmitting section as an output image (step S108).

As described above, in this embodiment, when a plurality of types of signal processing are performed for the image one after another, the number of repetitions of the signal processing can be reduced, and the speed in the signal processing can be enhanced.

(Third Embodiment)

Figure 7:
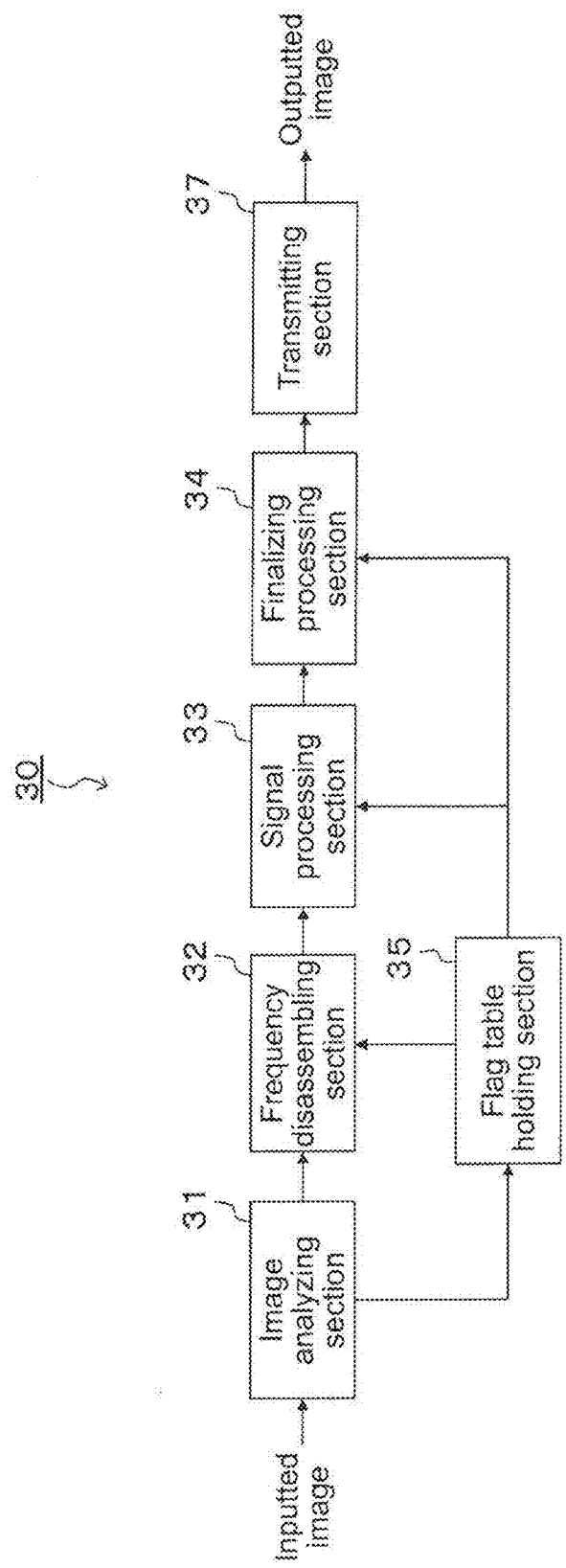
FIG. 7 is a block diagram showing the configuration of an image processing apparatus according to a third embodiment of the present disclosure.

FIG. 7 is a block diagram showing the configuration of an image processing apparatus according to a third embodiment of the present disclosure.

This image processing apparatus 30 has an image analyzing section (a characteristic point extracting section) 31, a frequency disassembling section 32, a signal processing section 33, a finalizing processing section 34, a flag table holding section 35, and a transmitting section 37. That is, as compared with the first and second embodiments, the image processing apparatus 30 according to the third embodiment differs in that the frequency disassembling section 32 and the finalizing processing section 34 exists.

The image analyzing section 31 divides an image into groups being two pixels by two pixels and calculates a difference between pixels adjacent to each other in each of the lateral, longitudinal and diagonal directions for each pixel group. When all the calculated differences in one pixel group are equal to or lower than a threshold value for high frequency component determination, the image analyzing section 31 determines that the pixel group is composed of pixels at approximately the same level, and selects one of the pixels as a characteristic point. In contrast, when one of four calculated differences in one pixel group is higher than the threshold value for high frequency component determination, two pixels producing the difference are selected as characteristic points.

The frequency disassembling section 32 classifies the characteristic points extracted by the image analyzing section 31, according to values of the characteristic points, into high level characteristic points and low level characteristic points, and produces an intermediate wavelet image by performing wavelet transform for the pixels determined to be the low level characteristic points and by dividing the pixel groups including the pixels determined to be the high level characteristic points into four quadrants to divide the original image into a low frequency component of a wavelet transformed image and three high frequency components (an X directional high frequency component, a Y directional high frequency component, and a Z directional high frequency component).

The signal processing section 33 performs signal processing for the high level characteristic points and the low frequency component in the intermediate wavelet image. The signal processing performed in the section 33 is of a type completed for each pixel and is white balance processing, black level adjustment and the like.

The finalizing processing section 34 produces a standard wavelet transformed image, in other words, a wavelet transformed image being reproducible to the original image by wavelet inverse transform by performing a type of wavelet transform, which is the same as the wavelet transform performed in the frequency disassembling section 32, for pixels being the high level characteristic points of the intermediate wavelet image for which the signal processing is performed.

The transmitting section 37 transmits the standard wavelet transformed image obtained by the finalizing processing section 34 as an output image.

Next, an action of the image processing apparatus 30 according to the third embodiment will be described.

Figure 8:
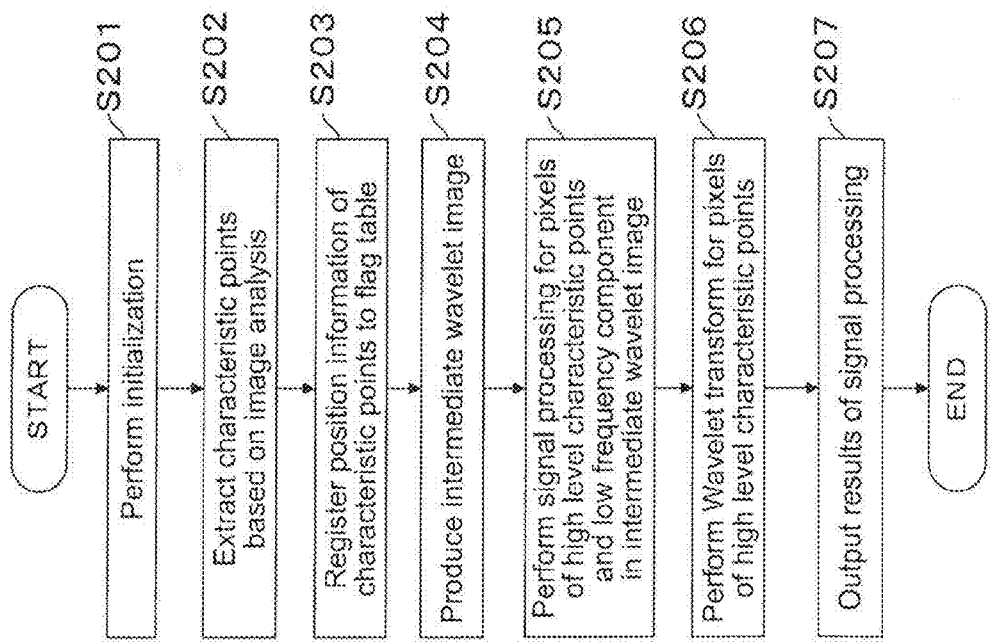
FIG. 8 is a flowchart showing the procedure of an action of the image processing apparatus according to the third embodiment.

FIG. 8 is a flowchart showing the procedure of an action of the image processing apparatus 30 according to this embodiment.

Initially, initializing processing of the image processing apparatus 20 such as initialization of registers and memories in the image processing apparatus 30 is performed (step S201).

Thereafter, an image is inputted to the image processing apparatus 30. The image analyzing section 31 divides the inputted image into pixel groups being two pixels by two pixels, calculates four differences in total for each pixel group, and compares each difference with a threshold value for high frequency component determination. These four differences in one pixel group denote a difference between values of pixels adjacent to each other in the lateral direction in the pixel group, a difference between values of pixels adjacent to each other in the longitudinal direction in the pixel group and a difference between values of pixels adjacent to each other in each of the diagonal directions in the pixel group. When all the calculated differences in one pixel group are equal to or lower than the threshold value, the image analyzing section 31 determines that the pixel group is composed of pixels at approximately the same level, and selects one pixel from among the pixels as a characteristic point. Further, when one of the four calculated differences in one pixel group is higher than the threshold value, the image analyzing section 31 selects two pixels producing the difference as characteristic points (step S202). Thereafter, the image analyzing section 31 registers position information of each pixel selected as one characteristic point in the image to the flag table (step S203).

Thereafter, while referring to the flag table, the frequency disassembling section 32 compares the value of each pixel determined to be one characteristic point with the threshold value for the high level characteristic point determination. The frequency disassembling section 32 determines each characteristic point, in which the value of the pixel is higher than the threshold value for the high level characteristic point determination, to be a "high level characteristic point", determines each characteristic point, in which the value of the pixel is equal to or lower than the threshold value for the high level characteristic point determination, to be a "low level characteristic point", and registers results of the determination to the flag table.

Figure 11:
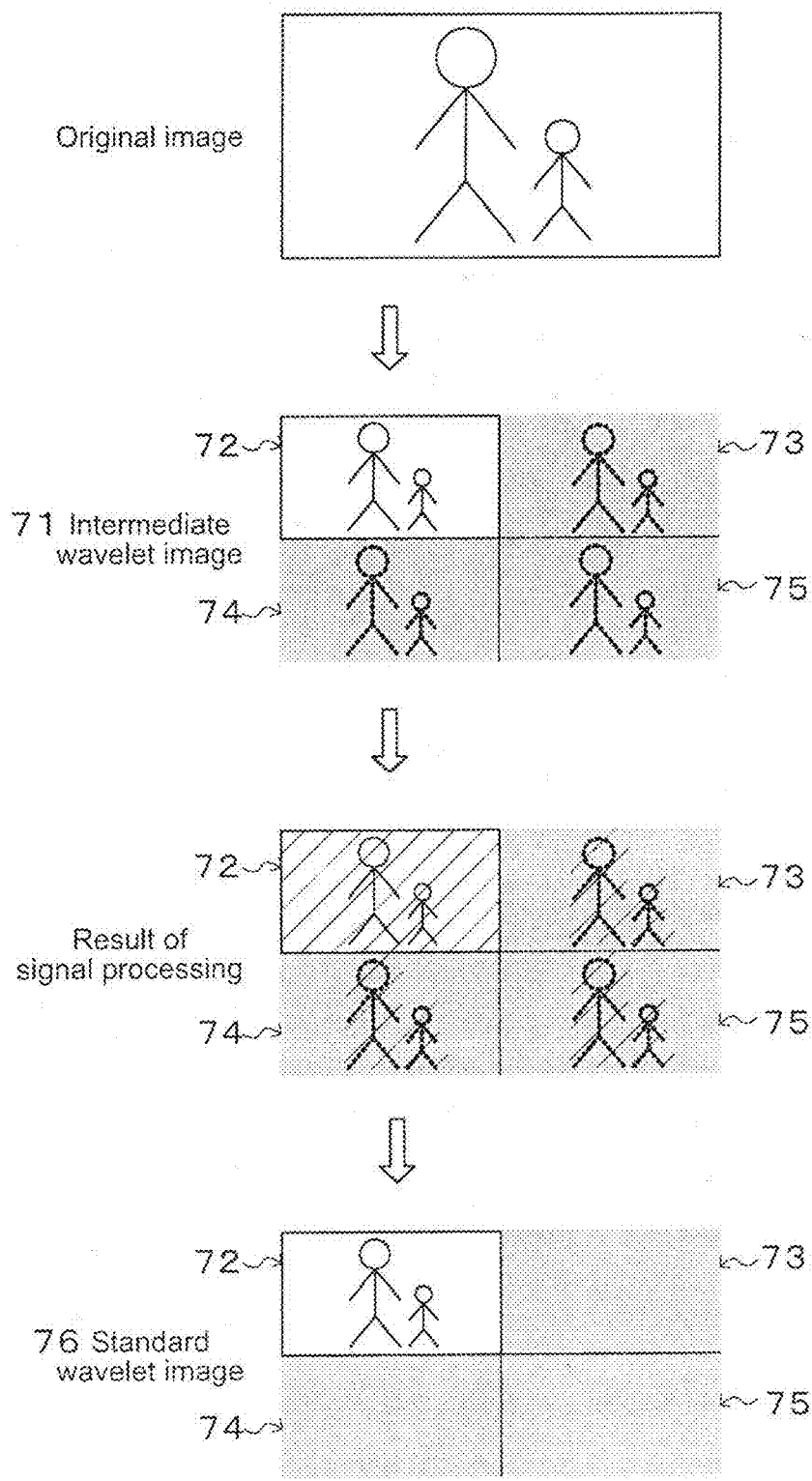
FIG. 11 is a diagram explaining the action of the image processing apparatus according to the third embodiment.

FIG. 11 is a diagram explaining the following processing.

The frequency disassembling section 32 produces an intermediate wavelet image 71 (see FIG. 11) by performing wavelet transform for the pixels determined to be the low level characteristic points, and by dividing the pixel groups, each of which includes one pixel determined to be the high level characteristic point, into four quadrants to divide the original image into a low frequency component 72 of a wavelet transformed image and three high frequency components 73, 74 and 75 (step S204). That is, the intermediate wavelet image 71 is an image in which a wavelet image obtained by the wavelet transform for the pixels of the low level characteristic points and the pixels of the high level characteristic points divided into four quadrants are mixed with one another.

Thereafter, the signal processing section 33 performs signal processing for the pixels of the high level characteristic points and the low frequency component 72 in the intermediate wavelet image 71 obtained from the frequency disassembling section 32 (step S205).

Thereafter, the finalizing processing section 34 specifies the pixels of the high level characteristic points, for which no frequency disassembling is performed, in the intermediate wavelet image, for which the signal processing is performed, according to the flag table, and performs the wavelet transform for these pixels of the high level characteristic points (step S206). Therefore, a standard wavelet image, in other words, a wavelet image 76 (see FIG. 11) produced by performing the frequency disassembling for all pixels of the inputted original image is obtained.

Thereafter, the transmitting section 37 transmits the wavelet image 76 obtained by the finalizing processing section 34 as an output image (step S207). The transmitting section 37 may transmit an output image set in the state of the intermediate wavelet image. In this case, after dividing the intermediate wavelet image into a low frequency region and a high frequency region and compressing the components of one region or both regions by entropy coding, the image may be transmitted. Because the component of the low frequency region is transmitted in a non-compressed state, the image can be efficiently monitored, as it is, in an apparatus receiving the transmitted image without decoding.

Because wavelet inverse transformation is performed for the wavelet image thus obtained in an apparatus receiving the transmitted image, the signal processing is substantially performed for the whole wavelet image.

As described above, in the image processing apparatus 30 according to this embodiment, even when the signal processing is not performed for all pixels of the image, an image approximately the same as an image in which the signal, processing is performed for all pixels can be obtained. Accordingly, the amount of the signal processing can be reduced, and the signal processing can be efficiently performed for a super high-definition image such as 4K high-definition image or 8K high-definition image.

In the case of a certain type of signal processing, it is difficult to obtain the result of the signal processing by calculating only values of pixels for which the signal processing is performed. For example, in the signal processing such as detail processing like detail correction or bi-cubic interpolation, it is generally necessary to use values of a plurality of pixels existing on the periphery of pixels that are to be subjected to the signal processing. Hereinafter, this type of signal processing is called a "peripheral pixel-using signal processing". When performing this peripheral pixel-using signal processing, the signal processing section 33 performs a following action.

1. When a portion of or all peripheral pixels among one or more peripheral pixels to be referred to for the peripheral pixel-using signal processing are pixels other than the characteristic point in each group, the image analyzing section 31 gives an interpolated value, being based on the value of the pixel of the characteristic point in the group, to the pixels other than the characteristic point in the same group to upgrade the pixels to characteristic points.
2. The image analyzing section 31 registers position information of the pixels, upgraded to the characteristic points, to the flag table.
3. The following action is the same. That is, after the frequency disassembling section 32 determines whether each characteristic point is a high level characteristic point or a low-level characteristic point, the frequency disassembling section 32 prepares an intermediate wavelet image. Then, the signal processing section 33 performs the common signal processing for the pixels of the high level characteristic points and the low frequency component in the intermediate wavelet image. Thereafter, the finalizing processing and the transmitting processing are performed.

(Fourth Embodiment)

In the third embodiment, when the peripheral pixel-using signal processing is performed, an interpolated value, based on the value of the pixel of the characteristic point in the same group, is given to pixels other than the characteristic point in the group to upgrade the pixels to characteristic points. However, in this method, there is the probability that the compression effect is considerably reduced because of the increase of the ratio of characteristic points occupying the transmitted image.

In the fourth embodiment, before the production of an intermediate wavelet image, the frequency disassembling section 42 performs the peripheral pixel-using signal processing for one or more pixel groups, each of which includes one high level characteristic point, among pixel groups, each of which includes one peripheral pixel to be referred to for the performance of the peripheral pixel-using signal processing. Therefore, the problem described above is solved. Hereinafter, an image processing apparatus according to this embodiment will be described in detail.

Figure 9:
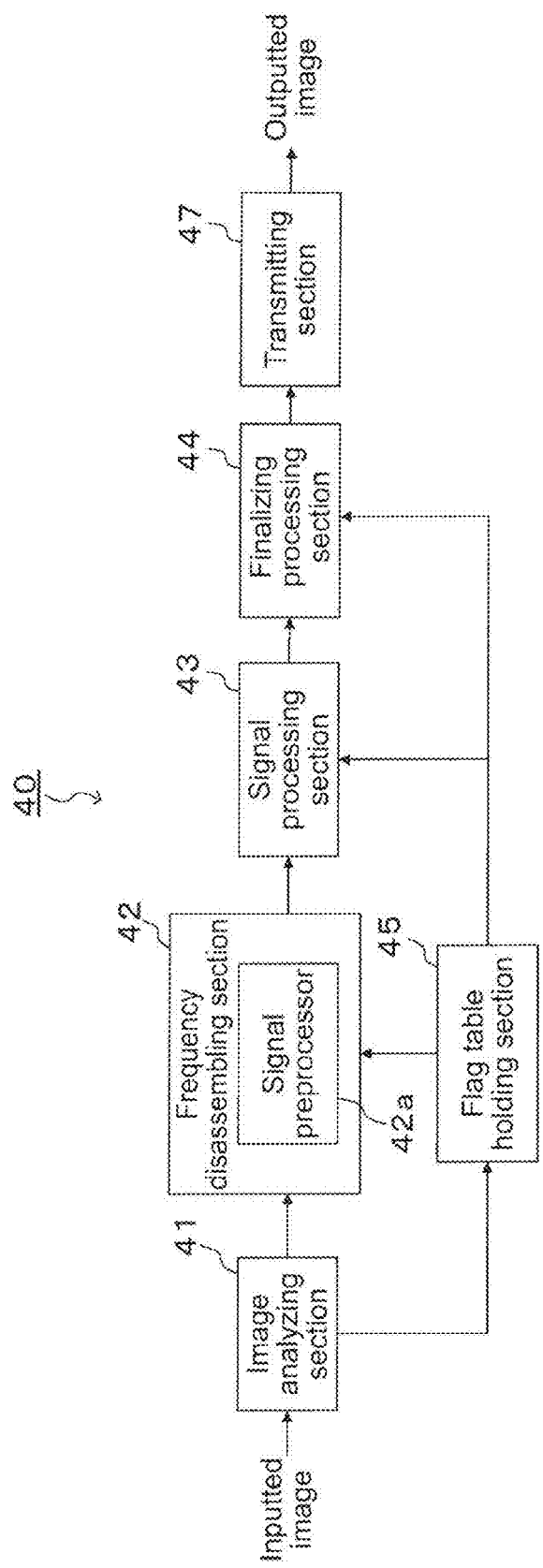
FIG. 9 is a block diagram showing the configuration of an image processing apparatus according to a fourth embodiment of the present disclosure.

FIG. 9 is a block diagram showing the configuration of an image processing apparatus according to the fourth embodiment of the present disclosure.

This image processing apparatus 40 has an image analyzing section 41, a frequency disassembling section 42, a signal processing section 43, a finalizing processing section 44, a flag table holding section 45, and a transmitting section 47. The frequency disassembling section 42 has a signal preprocessor 42a. The other configuration is the same as the configuration in the third embodiment.

Figure 10:
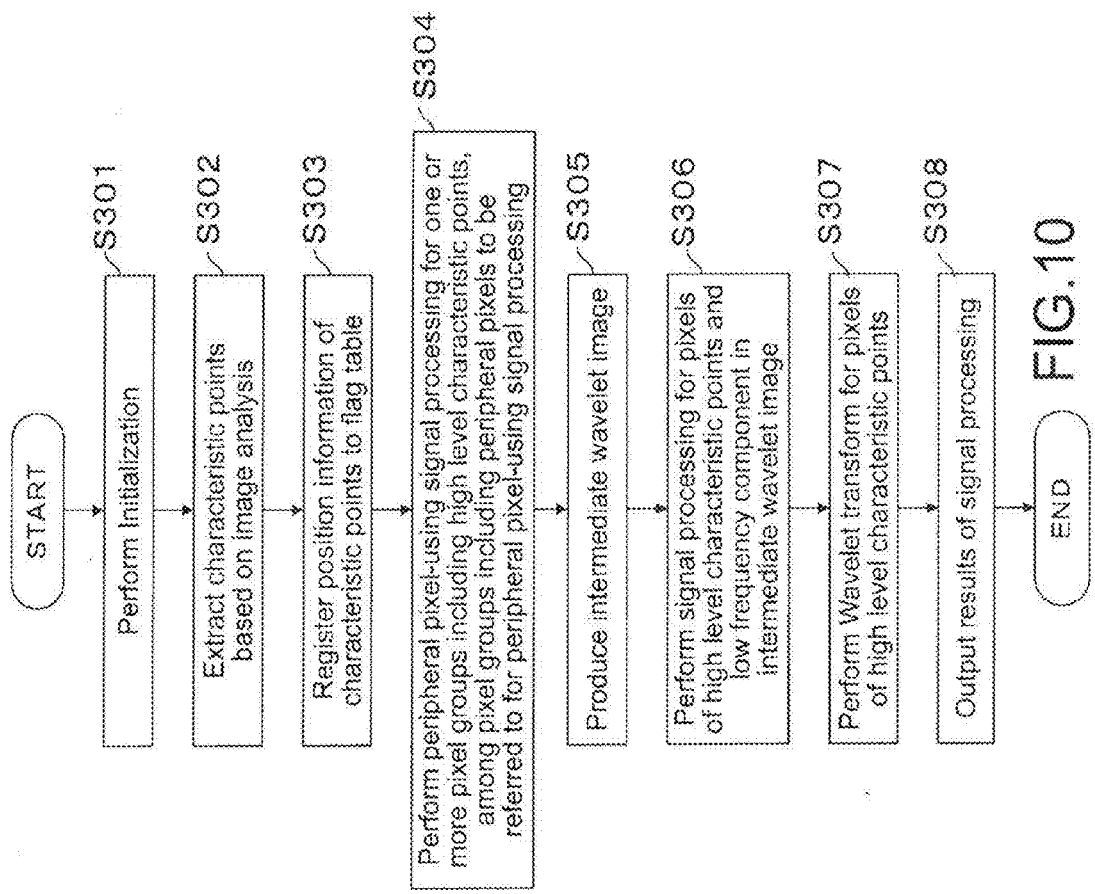
FIG. 10 is a flowchart showing the procedure of an action of the image processing apparatus according to the fourth embodiment.

FIG. 10 is a flowchart showing the procedure of an action of this image processing apparatus 40.

Initially, initializing processing of the image processing apparatus 40 such as initialization of registers and memories in the image processing apparatus 40 is performed (step S301).

Thereafter, an image is inputted to the image processing apparatus 40. The image analyzing section 41 divides the inputted image into pixel groups being two pixels by two pixels, and calculates four differences in total, composed of a difference between values of pixels adjacent to each other in the lateral direction, a difference between values of pixels adjacent to each other in the longitudinal direction and a difference between values of pixels adjacent to each other in each of diagonal directions, for each pixel group. When all the calculated differences in one pixel group are equal to or lower than a threshold value for high frequency component determination, the image analyzing section 41 determines that the pixel group is composed of pixels at approximately the same level, and selects one pixel from among the pixels as a characteristic point. Further, when one of the four calculated differences in one pixel group is higher than the threshold value for high frequency component determination, the image analyzing section 41 selects two pixels producing the difference as characteristic points (step S302). Thereafter, the image analyzing section 41 registers position information of each pixel selected as one characteristic point, in the image to a flag table (step S303).

Thereafter, while referring to the flag table, the frequency disassembling section 42 specifies all pixels determined to be the characteristic points, and compares the value of each pixel determined to be one characteristic point with the threshold value for the high level characteristic point determination. The frequency disassembling section 42 determines each characteristic point, in which the value of the pixel is higher than the threshold value for the high level characteristic point determination, to be a "high level characteristic point", and registers results of the determination to the flag table.

Figure 12:
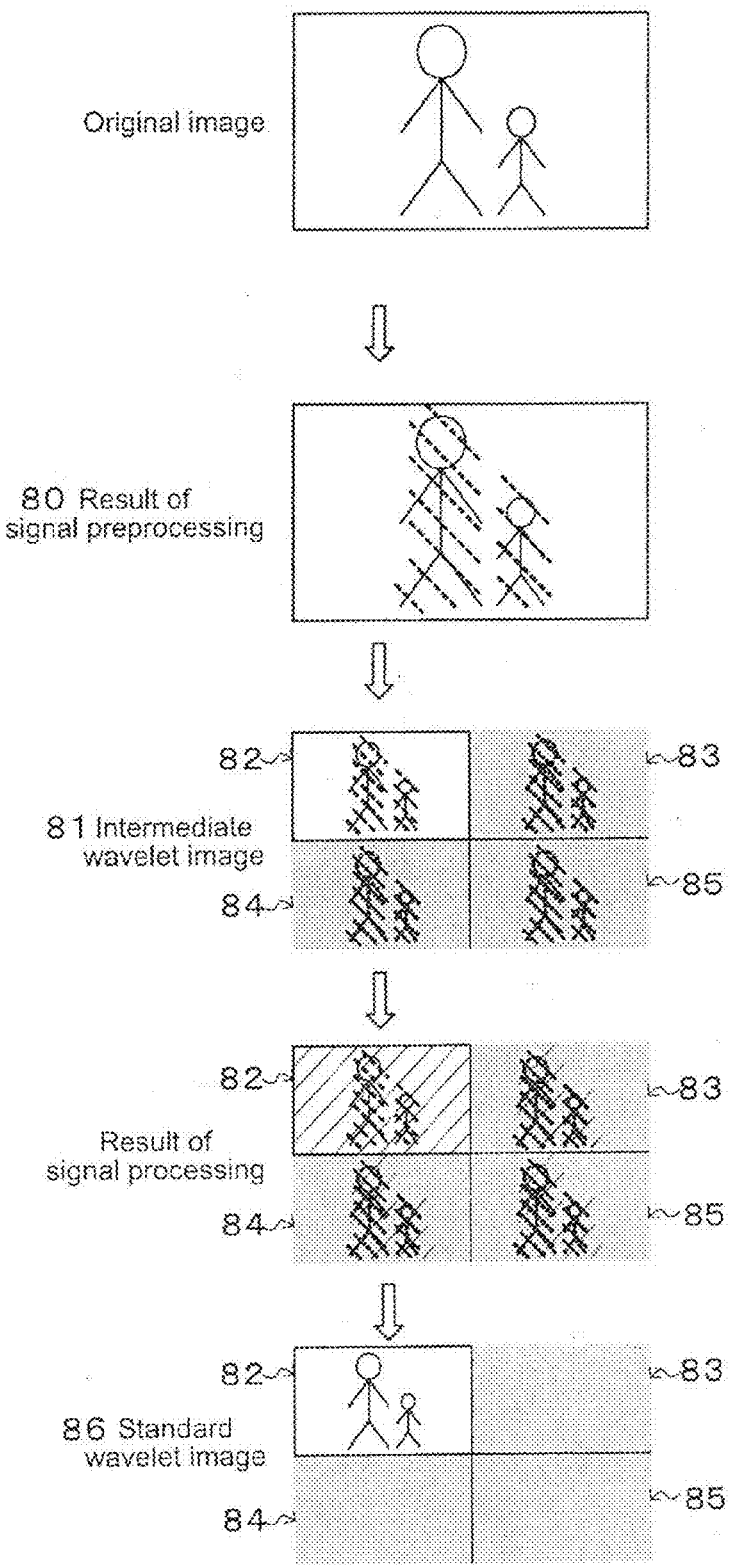
FIG. 12 is a diagram explaining the action of the image processing apparatus according to the fourth embodiment.

FIG. 12 is a diagram explaining the following action.

Next, while referring to the flag table, the signal preprocessor 42a of the frequency disassembling section 42 specifies one or more pixel groups, each of which includes one high level characteristic point, among pixel groups, each of which includes one peripheral pixel to be referred to for the performance of the peripheral pixel-using signal processing. The signal preprocessor 42a performs the peripheral pixel-using signal processing for each specified pixel group (step S304). Therefore, the result 80 of the signal preprocessing (see FIG. 12) is obtained.

Next, while again referring to the flag table, the frequency disassembling section 42 specifies all pixels of the characteristic points and compares the value of each pixel determined to be one characteristic point with the threshold value for high level characteristic point determination. The frequency disassembling section 42 determines each characteristic point, in which the value of the pixel is higher than the threshold value for the high level characteristic point determination, to be a "high level characteristic point", determines each characteristic point, in which the value of the pixel is equal to or lower than the threshold value for the high level characteristic point determination, to be a "low level characteristic point", and renews the flag table with the result of the determination.

While referring to the flag table, the frequency disassembling section 42 produces an intermediate wavelet image 81 (see FIG. 12) by performing wavelet transform for the pixels determined to be the low level characteristic points, and by dividing the pixel groups including the pixels determined to be the high level characteristic points into four quadrants to divide the original image into a low frequency component 82 of a wavelet transformed image and three high frequency components 83, 84 and 85 (step S305).

Thereafter, the signal processing section 43 performs a type of signal processing, which is completed for each pixel and is white balance processing, black level adjustment and the like, for the pixels of the high level characteristic points and the low frequency component in the intermediate wavelet image (step S306).

Thereafter, the finalizing processing section 44 specifies the pixels of the high level characteristic points, for which no frequency disassembling is performed, in the intermediate wavelet image according to the flag table, and performs the wavelet transform for these pixels of the high level characteristic points (step S307). Therefore, a standard wavelet image, in other words, a wavelet image 86 (see FIG. 12) produced by performing the frequency disassembling for all pixels of the inputted original image is obtained.

Thereafter, the transmitting section 47 transmits the wavelet image 86 obtained by the finalizing processing section 44 as an output image (step S308). The transmitting section 47 may transmit an output image set in the state of the intermediate wavelet image. In this case, after dividing the intermediate wavelet image into a low frequency region and a high frequency region and compressing the components of one region or both regions by entropy coding, the image may be transmitted.

Because wavelet inverse transformation is performed for the obtained wavelet image in an apparatus receiving the image, the image is substantially equivalent to an image in which the signal processing is performed for all pixels.

As described above, in the image processing apparatus 40 according to this embodiment, even when the signal processing is not performed for all pixels of the image, an image in which the signal processing is performed for all pixels can be obtained. Accordingly, the amount of the signal processing can be reduced, and the signal processing can be efficiently performed for a super high-definition image such as 4K high-definition image or 8K high-definition image. Further, in the image processing apparatus 40 according to this embodiment, even when signal processing generally needing values of a plurality of peripheral pixels is performed, the ratio of characteristic points occupying the transmitted image is not increased. Accordingly, the reduction of the compression effect can be suppressed.

The present disclosure contains subject matter related to that disclosed in Japanese Priority Patent Application JP 2011-117697 filed in the Japan Patent Office on May 26, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
    a characteristic point extracting section configured to analyze a frequency component of an inputted image and extract a plurality of pixels characterizing the image as high level characteristic points and low level characteristic points;
    a wavelet producing section configured to produce a wavelet image based on the extracted pixels corresponding to the low level characteristic points, and a low frequency component of the wavelet image; and
    a signal processing section configured to perform signal processing for the pixels corresponding to the high level characteristic points and the low frequency component, to produce an interpolated value based on a result of the signal processing, and to rewrite a value of at least one pixel other than the characteristic points to the interpolated value.

2. The image processing apparatus according to claim 1, wherein the characteristic point extracting section sets each of regions of the inputted image, in which a difference between pixels adjacent to each other is within a threshold value, as a pixel group and extracts at least one pixel as one characteristic point for each pixel group, and wherein the signal processing section produces the interpolated value for each pixel group, based on the result of the signal processing for the pixel corresponding to the characteristic point belonging to the pixel group, and rewrites the value of one pixel other than the characteristic point in the pixel group to the interpolated value of the pixel group.

3. The image processing apparatus according to claim 2, wherein the signal processing section performs a plurality of types of signal processing, and wherein the characteristic point extracting section extracts the characteristic point by using the threshold value, which is selected in advance so as to match with the type of signal processing, for each type of signal processing.

4. An image processing apparatus, comprising:

a characteristic point extracting section configured to divide an inputted image into pixel groups each of which is two pixels in a lateral direction by two pixels in a longitudinal direction, extract at least one pixel for each pixel group as a characteristic point in accordance with a difference between pixels adjacent to each other in the pixel group, and classify the extracted characteristic points to high level characteristic points and low level characteristic points;

a frequency disassembling section configured to produce an intermediate wavelet image by performing wavelet transform for the pixels determined to be the low level characteristic points to produce a wavelet transformed image and dividing the pixel groups including the pixels determined to be the high level characteristic points into four quadrants to divide the inputted image into three high frequency components and a low frequency component of the wavelet transformed image;

a signal processing section configured to perform signal processing for the pixels of the high level characteristic points and the low frequency component in the intermediate wavelet image to change visibility of the pixels; and a finalizing processing section configured to perform the wavelet transform for the pixels of the high level characteristic points of the intermediate wavelet image for which the signal processing has been performed.

5. The image processing apparatus according to claim 4, wherein the signal processing section performs the signal processing for the pixels to be subjected to the signal processing by using a value of at least one peripheral pixel located on a periphery of the pixel, and wherein when one of a portion and all of the at least one peripheral pixel includes pixels other than the characteristic point, the characteristic point extracting section gives an interpolated value based on the value of the pixel of the characteristic point of the pixel group to the pixels other than the characteristic point of the pixel group to upgrade the pixels other than the characteristic point to character points.

6. The image processing apparatus according to claim 4, wherein the finalizing processing section has a signal preprocessor configured to perform a specific type of signal processing for at least one pixel group, which includes one high level characteristic point, among the pixel groups, each of which includes one peripheral pixel to be referred to for the signal processing, before the production of the intermediate wavelet image.

7. A method of processing an image, comprising:

extracting a plurality of pixels characterizing an inputted image as high level characteristic points and low level characteristic points by analyzing a frequency component of the image;

producing a wavelet image based on the extracted pixels corresponding to the low level, characteristic points, and a low frequency component of the wavelet image; and rewriting a value of at least one pixel other than the characteristic points to an interpolated value by performing signal processing for the pixels corresponding to the high level characteristic points and the low frequency component, by producing the interpolated value based on a result of the signal processing.

8. A method of processing an image, comprising:

dividing an inputted image into pixel groups each of which is two pixels in a lateral direction by two pixels in a longitudinal direction;

extracting at least one pixel for each pixel group as a characteristic point in accordance with a difference between pixels adjacent to each other in the pixel group;

classifying the extracted characteristic points to high level characteristic points and low level characteristic points;

producing an intermediate wavelet image by performing wavelet transform for the pixels determined to be the low level characteristic points to produce a wavelet transformed image and dividing the pixel groups including the pixels determined to be the high level characteristic points into four quadrants to divide the inputted image into three high frequency components and a low frequency component of the wavelet transformed image;

performing signal processing for the pixels of the high level characteristic points and the low frequency component in the intermediate wavelet image; and performing the wavelet transform for the pixels of the high level characteristic points of the intermediate wavelet image for which the signal processing has been performed.

* * * * *